United States Patent [19]
Umino et al.

[11] 3,944,779
[45] Mar. 16, 1976

[54] PROCESS FOR FUSION-WELDING IRON-NICKLE-COBALT ALLOY AND COPPER OR SAID ALLOY, COPPER AND IRON

[75] Inventors: Tomio Umino, Hitachi; Munenobu Suzuki, Mito; Tomohiko Shida, Hitachi, all of Japan

[73] Assignee: Hitachi, Ltd., Japan

[22] Filed: July 2, 1974

[21] Appl. No.: 485,252

[30] Foreign Application Priority Data
July 4, 1973    Japan.............................. 48-74791

[52] U.S. Cl............................ 219/121 EM; 219/118
[51] Int. Cl.².......................................... B23K 15/00
[58] Field of Search 219/121 EM, 121 EB, 121 LM, 219/121 L, 118, 137, 136

[56] References Cited
UNITED STATES PATENTS

| | | | |
|---|---|---|---|
| 1,750,643 | 3/1930 | Murray, Jr. et al................. | 219/118 |
| 3,560,700 | 2/1971 | Reidelsturz et al.......... | 219/121 EM |
| 3,617,685 | 11/1971 | Brill-Edwards et al. ...... | 219/121 EB |

*Primary Examiner*—J. V. Truhe
*Assistant Examiner*—G. R. Peterson
*Attorney, Agent, or Firm*—Craig & Antonelli

[57] ABSTRACT

In a process for fusion-welding a binary combination of an iron alloy containing 50 % by weight or less of nickel and cobalt combined and copper; or a ternary combination of said iron alloy, copper, and iron, including the steps of bringing members of said binary combination or ternary combination into gapless contact with one another and subjecting the contact zone to a treatment including at least one of electron beam welding, laser beam welding, plasma welding, and TIG welding without use of a filler metal, an improvement which is characterized by supplying welding energy necessary to form in the welding zone molten weld metal having such a width and depth that have been determined from the composition and thickness of said base metals so that the composition of the weld metal may fall within the specified area in a diagram, shown in FIG. 1, representing composition of a three component system, said specified area being enclosed with straight lines connecting successively the point X (97 wt-% Cu, 2 wt-% Fe, 1 wt-% Ni + Co), the point Y (2 wt-% Cu, 49 wt-% Fe, 49 wt-% Ni + Co), the point Z (2 wt-% Cu, 97 wt-% Fe, 1 wt-% Ni + Co), and the point X except for the area enclosed with straight lines connecting successively the point a (35 wt-% Cu, 32.5 wt-% Fe, 32.5 wt-% Ni + Co), the point b (10 wt-% Cu, 45 wt-% Fe, 45 wt-% Ni + Co), the point c (8 wt-% Cu, 91 wt-% Fe, 1 wt-% Ni + Co), the point d (45 wt-% Cu, 54 wt-% Fe, 1 wt-% Ni + Co), and the point a. According to this improved process, development of weld cracking can be prevented.

7 Claims, 27 Drawing Figures

PROCESS FOR FUSION-WELDING IRON-NICKLE-COBALT ALLOY AND COPPER OR SAID ALLOY, COPPER AND IRON

BACKGROUND OF THE INVENTION

1. Field of the Invention

This invention relates to a process for fusion-welding a binary combination of an iron alloy containing 50% by weight or less of nickel and cobalt combined and copper, or a ternary combination of said iron alloy, copper, and iron by bringing members of said binary or ternary combination into gapless contact with one another and subjecting the contact zone to a treatment selected from electron beam welding, laser beam welding, plasma welding, and TIG welding without use of a filler metal.

2. Description of the Prior Art

In an electromagnetic wave generating device (magnetron) and a semiconductor device for use in an electronic range, it becomes necessary to make a joint by brazing between a ceramic insulator and a Co-Ni-Fe alloy such as Fernico or Kovar. Because of its thermal expansion coefficient approximating to that of ceramics, the Co-Ni-Fe alloy is widely used in the above-noted field.

In the semiconductor device and magnetron, welding of the Co-Ni-Fe alloy with copper or with both copper and iron is also conducted. In welding together a Co-Ni-Fe alloy and copper or Co-Ni-Fe alloy, copper, and iron, it is concievable to conduct the welding by forming weld beveling and by use of a filler metal. However, in such a case as in electronic parts where the parts to be welded are small in size and complicated in structure, it is inadequate to form a weld beveling. In an electronic device, deformation and strain build-up in its parts caused by the weld beveling should be avoided. It is desirable, therefore, if it is possible to make a butt welding or lap welding or to effect edge welding, without forming a weld beveling. The welding techniques adoptable for such purposes are electron beam welding, laser beam welding, plasma welding, and TIG welding without filler metal.

When an assembly of two base metals of copper and an Fe-Ni-Co alloy or of three base metals of copper, iron, and an Fe-Ni-Co alloy is fusion-welded by any of the methods comprising electron beam welding, laser beam welding, plasma welding, and TIG welding without using a filler metal, generally there occurs cracking in the weld metal. When observed under a microscope, the portion where cracking has occurred reveals a structure in which crystal grains of a metal containing mainly iron are surrounded by a solid solution in the form of film of a metal containing copper as the main constituent, and cracks are formed along the boundaries of crystal grains. From the observation, it is presumable that formation of cracks are due to the fact that in the course of solidification of the molten metal, a metal containing mainly iron, which has crystallized in the liquid phase begins to contract and so the remaining liquid phase is subject to an increasing tensile stress and at the final stage of solidification said stress gradually increases and when the liquid phase at grain boundary cannot stand the contraction, crevices occur.

In order to avoid cracking in a weldment, it is generally effective to add to the weld metal from an external source metal capable of preventing development of cracks. Such a means, however, lacks in reliability because of inclusion of a metal having a third composition different from the base metals, which probably tends to change mechanical or physical properties of the weldment, and, moreover, it is technically difficult to select the type of metal to be added and the means of adding such a metal. Under the circumstances, it is most desirable for the countermeasure against cracking to find a weld metal composition which resists cracking without addition of a metal from external sources and to find a welding method which is able to result in said composition in the weld metal.

SUMMARY OF THE INVENTION

Objects of the Invention

The main object of this invention is to provide an improvement whereby the weld metal is kept from cracking in a process for fusion-welding a binary combination of a iron alloy containing 50% by weight or less of the sum of nickel and cobalt and copper or a ternary combination of these two base metals and iron by bringing members of said binary or ternary combination into gapless contact and subjecting the contact zone to a treatment of electron beam welding, laser beam welding, plasma welding, or TIG welding without the use of a filler metal.

Another object of this invention is to provide an improved fusion welding process which exhibits a particularly favorable crack-preventive effect when applied to a binary combination of an iron-nickel-cobalt alloy, in which the nickel content is larger than the cobalt content, and copper or to a ternary combination of these two base metals with an iron base metal.

STATEMENT OF THE INVENTION

This invention provides an improvement in a process for fusion welding a base metal of iron alloy containing 50% by weight or less of the sum of nickel and cobalt and a base metal of copper together or these two base metals and a base metal of iron together by bringing members of said binary or ternary combination into gapless contact and subjecting the contact zone to a treatment of electron beam welding, laser beam welding, plasma welding, or TIG welding without the use of a filler metal, which improvement is characterized by supplying a welding energy necessary to form in the welding zone a molten weld metal having such a width and depth that have been determined from the composition and thickness of said base metals so that composition of the weld metal may fall within the specified area in a diagram representing composition of a three-component system comprising copper, iron, and a mixed component of nickel and cobalt, said specified area being enclosed with straight lines connecting successively a point representing a composition comprising 97% by weight of copper, 2% by weight of iron and 1% by weight of a mixed component of nickel and cobalt, a point representing a composition comprising 2% by weight of copper, 49% by weight of iron, and 49% by weight of a mixed component of nickel and cobalt, a point representing a composition comprising 2% by weight of copper, 97% by weight of iron, and 1% by weight of a mixed component of nickel and cobalt, and the point first indicated, except for the area enclosed with straight lines connecting successively a point representing a composition comprising 35% by weight of copper, 32.5% by weight of iron, and 32.5% by weight of a mixed component of nickel and cobalt, a point representing a composition comprising 10% by weight of copper, 45% by weight of iron, and 45% by weight of a mixed component of nickel and cobalt, a point representing a composition comprising 8% by weight of copper, 91% by weight of iron, and 1% by weight of a mixed component of nickel and cobalt, a point representing a composition comprising 45% by weight of copper, 54% by weight of iron, and 1% by weight of a mixed component of nickel and cobalt, and the point first indicated.

The fact that cracking does not occur in the weld metal having a composition represented by a point in the specified area of the accompanying diagram representing composition of a three-component system comprising iron, copper, and a mixed component of nickel and cobalt was found from a comprehensive examination of the results obtained in scores of experiments.

The weld metal having a composition falling within the specified area has either a structure in which crystal grains of a metal consisting mainly of iron are dispersed in a predominant amount of a solid solution containing a metal consisting mainly of copper, or a structure in which copper is completely dissolved as a solid solution in the crystal grains of a metal consisting mainly of iron, but has not a structure having segregation pattern in which grain boundaries of crystal grains of a metal consisting mainly of iron are surrounded by a solid solution in the form of thin film of a metal consiting mainly of copper, which causes cracks. Nickel and cobalt are present in the form of solid solution in iron or copper, but not in the form of crystal grains of their own.

The improved fusion welding process of this invention exhibits a particularly favorable crack-preventive effect when applied to a combination of two base metals of an iron-nickel-cobalt alloy, in which the nickel content is larger than the cobalt content, and copper or to a combination of these two base metals with an iron base metal. This is presumably because nickel has a superior ability to prevent weld cracking to that of cobalt. A preferable ratio of the nickel content to the cobalt content is equal to or larger than 1.5:1.

The weld metal in this invention consists of an alloy of copper, iron, nickel, and cobalt. It is to be specifically noted that the range of elementary composition of the weld metal can be represented by the accompanying composition diagram of a three-component system comprising copper, iron, and a mixed component of nickel and cobalt.

The fusion welding of this invention should be accomplished by a means selected from the electron beam welding, laser beam welding, plasma welding, and TIG welding without using a filler metal. In the electron beam welding, laser beam welding, and plasma welding, welding can be accomplished in a shorter time than by other welding methods because the beam has a high energy density and can be sharply focused. In such a method, welding is carried out not necessarily along the butt faces of base metals, as is the case with an ordinary shield arc welding or gas welding, but can be accomplished by irradiating the laser beam or electron beam to the base metals assembled in layers, as is desirable in joining together multiple base metals. The plasma welding and the TIG welding (especially pulse arc welding) are suitable for local welding of base metals because the arc can be more easily focused than in the usual arc welding.

Other welding methods are unsuitable for use in this invention, because control of the weld metal composition is difficult to attain the specified composition of this invention and, moreover, the molten zone becomes wider, tending to cause penetration and other welding defects.

In this invention, copper content of the weld metal is particularly desired to be 70% by weight or less. This is based on the finding that when the copper content exceeds 70% by weight, cracking tends to occur not in the weld metal but in the heat affected zone.

This invention is based upon the finding that when a binary base-metal combination of an iron-nickel-cobalt alloy containing 50% by weight or less of the sum of nickel and cobalt and copper, or a ternary combination of these two base metals and iron is fusion-welded by bringing said combination into gapless contact with one another and subjecting the contact zone to a treatment selected from electron beam welding, laser beam welding, plasma welding, and TIG welding without using a filler metal, there occurs no weld cracking in the weld metal of a composition in the aforesaid range. In order to ensure such a weld metal composition, it is necessary to follow the following procedure which comprises determining the width and depth of the base metals to be melted to form a weld metal of the composition in the aforesaid range, said determination being made from the composition and thickness of the base metals, and supplying to the welding zone a welding energy required to form said molten weld metal. In the electron beam welding, laser beam welding, etc., since molten base metals form a uniform mixture throughout the depth of melt, it is easy from the composition and thickness of the base metals to determine the width and depth of the base metals to be melted to form a weld metal of the predetermined composition. When such determination is made, it is easy to calculate the quantity of welding energy to be supplied to the welding zone.

Figure 1:
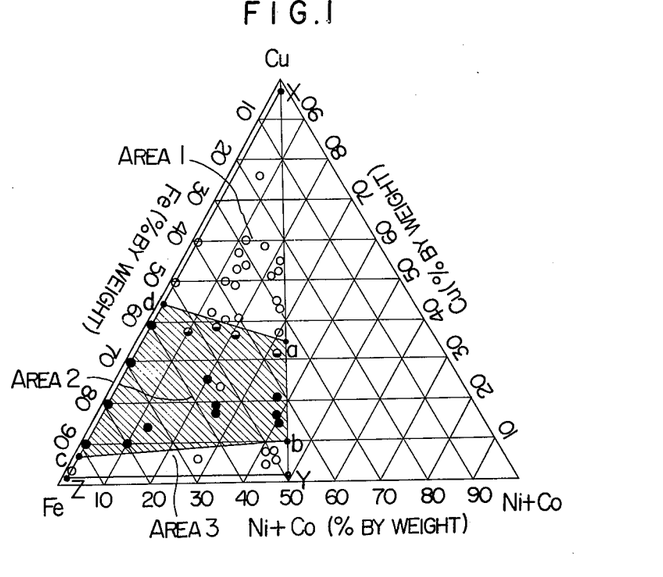
FIG. 1 is a composition diagram of a three-component system comprising copper, iron, and a mixed component of nickel and cobalt, wherein experimental results of weld cracking are plotted.

In the case where welding is accomplished by use of a filler metal along the beveling portions previously prepared, even though the composition range wherein the weld cracking does not occur, as shown in FIG. 1, is known, it is more difficult, compared with the case of gapless welding, to determine the welding conditions so that a weld metal of the predetermined composition may be resulted. In the gapless welding it is easy to determine thickness of the base metals, weld width, weld depth, and the corresponding quantity of the required energy, because when electron beam, laser beam, plasma, or arc is used, the composition of weld metal depends almost entirely upon the position of exposure, direction, amplitude of swing of the beam or arc, and applied ampere.

EXAMPLE 1

A binary combination of copper and an iron-nickel-cobalt alloy and a ternary combination of copper, iron, and an iron-nickel-cobalt alloy were respectively joined together by electron beam welding. In both cases, welding was carried out in such a manner that after the base metals had been placed one over another so that the iron-nickel-cobalt alloy and copper metal may occupy the uppermost position and the lowest position, respectively, an electron beam was applied to the surface of the iron-nickel-cobalt alloy to effect welding. In each case, the resulting weld metal was tested by observation with microsope for cracking and analyzed for chemical composition. Several of the results obtained were as shown in Table 1. The iron-nickel-cobalt alloy employed in this Example comprised 30% by weight nickel, 20% by weight cobalt, and 50% by weight iron.

Table 1

| Combination of base metals | Composition of weld metal (% by weight) | | | Cracking |
| --- | --- | --- | --- | --- |
| | Cu | Fe | Ni+Co | |
| Fe-Ni-Co alloy & Cu | 12.4 | 46.4 | 41.2 | Occurred |
| " | 8.4 | 48.5 | 43.1 | Did not occur |
| " | 52.2 | 25.3 | 22.5 | Did not occur |
| Fe-Ni-Co alloy & Cu & Fe | 25.3 | 54.7 | 20.0 | Occurred |
| " | 14.6 | 74.0 | 11.4 | Occured |
| " | 37.1 | 42.8 | 20.1 | Microcracks |
| " | 40.0 | 43.5 | 16.5 | Microcracks |
| " | 59.0 | 24.5 | 16.5 | Did not occur |
| " | 50.0 | 38.6 | 11.4 | Did not occur |

FIG. 1 is a composition diagram of the three-component system comprising a mixed component of nickel and cobalt, copper and iron, obtained by plotting the results obtained in this Example. In FIG. 1 white dots represent compositions which showed no weld cracking, black dots represent those which showed weld cracking, and the dots partly white and partly black represent those which showed no cracking on inspection with naked eyes but revealed micro-cracking on microscopic examination.

In this invention, the weld metal should be of the composition in the area enclosed by the straight lines connecting successively the point X (97% by weight Cu, 2% by weight Fe, 1% by weight Ni plus Co), the point Y (2% by weight Cu, 49% by weight Fe, 49% by weight Ni plus Co), the point Z (2% by weight Cu, 97% by weight Fe, 1% by weight Ni plus Co), and the point X, excluding the area enclosed by straight lines connecting successibly the point $a$ (35% by weight Cu, 32.5% by weight Fe, 32.5% by weight Ni plus Co), the point $b$ (10% by weight Cu, 45% by weight Fe, 45% by weight Ni plus Co), the point $c$ (8% by weight Cu, 91% by weight Fe, 1% by weight Ni plus Co, the point $d$ (45% by weight Cu, 54% by weight Fe, 1% by weight Ni plus Co), and the point $a$. Weld cracking takes place in a weld metal having a composition falling within the area enclosed by the straight lines connecting successively the point $a$, $b$, $c$, $d$, and $a$. A composition falling outside the area enclosed by the straight lines connecting successively the points X, Y, Z, and X cannot be actually taken. In the weld metals having a composition in the area 1 or 3, no weld cracking occurs.

The area 2 represents those compositions of weld metals which are usually obtained unless due consideration has been paid to the arrangement of the base metals, the position where the welding energy is supplied to the assembly of base metals, or other factors in order to control composition of the weld metal to be obtained. For this reason, weld cracking could not been prevented by mere application of a customary fusion-welding technique.

Microscopic structures of the weld metals having the compositions falling within the areas 1, 2 and 3, respectively, may be interpreted in the following manner.

A weld metal of the composition in the area 1 contains major amounts of copper and, accordingly, has a structure in which a small amount of metal consisting chiefly of iron is dispersed in a matrix metal consisting chiefly of copper. Since in the weld metal in this area, the metal mainly composed of iron is dispersed in the matrix, such a structure is not susceptible to weld cracking because of fluidity or deformability of the matrix which favorably affects resistance of the structure against cracking due to thermal shrinkage. A weld metal of the composition in the area 2 contains lesser amount of copper and has a structure in which grain boundaries of a metal containing chiefly iron are surrounded by a metal containing copper as the main constituent in a form of segregate at grain boundaries. Because of insufficient fluidity and deformability of grain boundaries in the course of solidification, cracks occur. The expanse of the area 2 relative to other areas diminishes with the increase in nickel plus cobalt content. This is due to the decrease in susceptibility of the weld metal to weld cracking, because along with the increase in nickel plus cobalt content, the iron content of the weld metal decreases relatively and the effect of nickel, which forms solid solution with copper in any proportion, becomes marked. The area 3 represents compositions of small copper content. The weld metal of the composition falling in this area has a structure in which the metal containing chiefly of copper has been entirely dissolved in the metal containing chiefly iron, forming a supersaturated solid solution during solidifying period, and, hence, the segregate containing chiefly copper is substantially absent. Therefore, in such a weld metal, cracking does not occur.

Figure 2A:
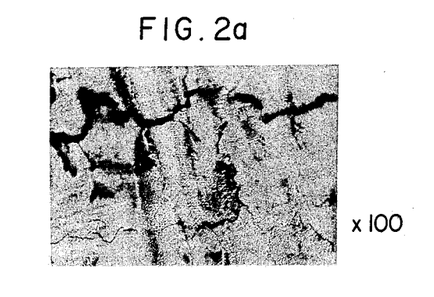
FIGS. 2a and 2b are photomicrographs of the structure of weld metals obtained by electron beam welding of iron-nickel-cobalt alloy and copper.
Figure 2B:
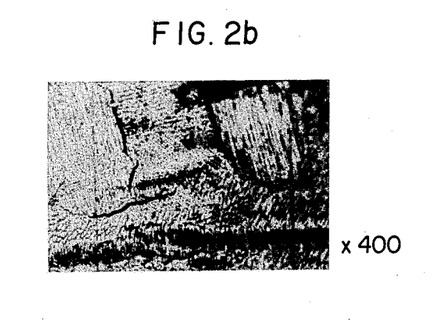

In FIGS. 2a and 2b are shown microstructures of weld metals obtained by fusion-welding a binary combination of an iron-nickel-cobalt alloy and copper. Magnification is 100 in FIG. 2a and 400 in FIG. 2b. The weld metal had a composition falling within the area 2, since it contained 18% by weight of copper, 57% by weight of iron, and 25% by weight of nickel plus cobalt. This weld metal distinctly showed weld cracking.

Figure 3:
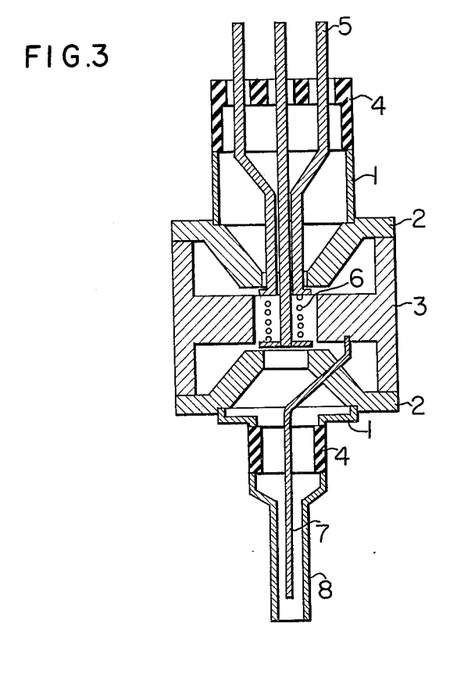
FIG. 3 is a sectional view of a microwave oscillator tube where the process of this invention is applied.

The process of this invention can be applied to welding of elements in assembling a microwave oscillator tube which is one of the special electron tubes and constructed generally as shown in FIG. 3. The seal 1 is generally made of an iron alloy containing about 50% by weight of nickel and cobalt and joined to the magnetic pole 2 and to the electrical insulator 4. The magnetic pole 2, which guides electrons emitted from the filament 6 to a prescribed path, is made of ferro iron of desirable magnetic characteristics. The anode 3, which promotes resonance of the electron, is made of copper. Joining of the seal 1 to the magnetic pole 2 and joining of the magnetic pole 2 to the anode 3 have conventionally been effected by brazing. Brazing, however, often yields unreliable results, because selection of a proper filler metal and flux is difficult and propriety of the selection affects properties of the resultant joint. Therefore, joining without use of a filler metal or flux is recommendable. An ordinary fusion welding is unsuitable, because the above-noted parts have small thickness and are prone to detestable disfigurement. To the contrary, such welding methods as electron beam welding, laser beam welding, plasma welding, and TIG welding, which are able to afford high-density energy, are suitable because with these methods fusion and solidification can be accomplished in a short time and, in addition, fusion can be limited to a very small area. Moreover, three pieces of a seal 1, magnetic pole 2, and anode 3 can be welded at a time. Other parts include a cathode 5, output lead 7, and seal-off tube 8.

In FIGS. 4 to 13 are shown various types of joints which permit simultaneous fusion welding of the seal 1, magnetic pole 2, and anode 3 and which enable the resulting weld metal to have compositions resistant to weld cracking. These joints ensure weld metal compositions falling within the area 1 in FIG. 1. The material of the seal 1 is an alloy containing 50% by weight of sum of nickel and cobalt, the balance being iron.

Figure 4:
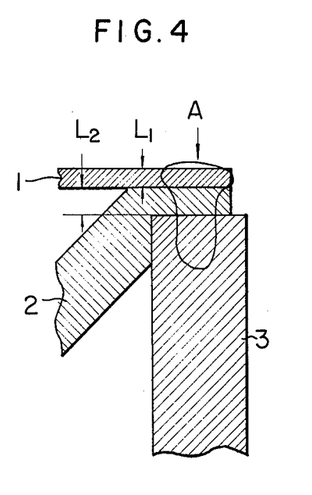
FIGS. 4 to 13 are examples of fusion welding of a seal, magnetic pole, and anode to be used in a microwave oscillator tube, shown in sectional view to illustrate several embodiments of this invention.

In FIG. 4, the seal 1, magnetic pole 2, and anode 3 are placed one over another and the welding energy is supplied from A in the direction indicated by an arrow to effect welding. It is desirable that the thickness $L_2$ of the magnetic pole 2 is 1.5 times the thickness $L_1$ of the seal 1 or less and the penetration depth is twice the sum of $L_1$ and $L_2$ or more.

Figure 5:
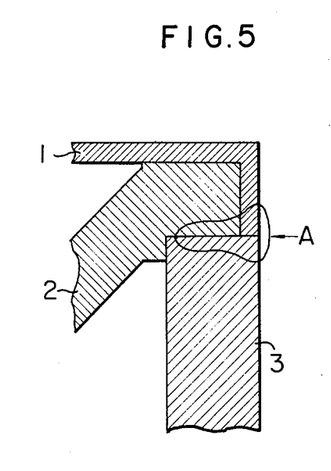

In FIG. 5, the seal 1 and the magnetic pole 2 are placed one over the other and the end face of the resulting assembly is brought into butt contact with the anode 3. The welding energy is supplied from above the butt contact interface. With this type of joint a weld metal containing at least 50% by weight of copper may be obtained.

Figure 6:
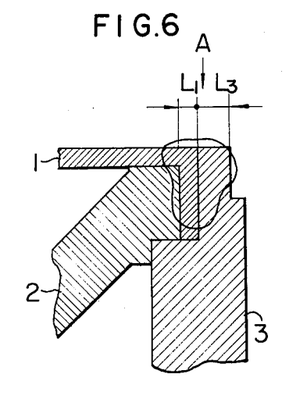

In FIG. 6, the seal 1 is interposed between the magnetic pole 2 and the anode 3. A quantity of the welding energy sufficient for melting simultaneously the three base metals is supplied from A in the direction indicated by an arrow. The recession at the upper part of the anode serves to keep the anode from bulging beyond the side face in case the anode is deformed owing to the welding heat. A weld metal of the composition falling within the area 1 in FIG. 1 is obtained when the thickness $L_3$ of the anode is made to be 2 times the thickness $L_1$ of the seal 1 or less.

Figure 7:
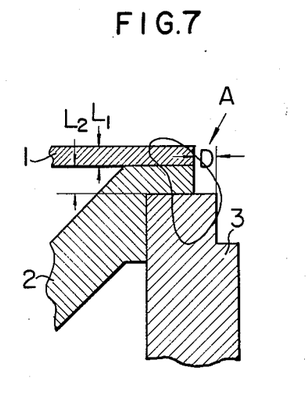

In FIG. 7, the seal 1, magnetic pole 2, and anode 3 are placed one over another. The welding energy is supplied to the edge of the resulting pile from above in the oblique direction indicated by an arrow A. It is advisable that the thickness $L_1$ of the seal 1 be larger than the thickness $L_2$ of the magnetic pole 2, and the distance D of a portion of the upper end face of the anode 3, where neither the seal nor the magnetic pole is mounted, be less than the sum of $L_1$ and $L_2$.

Figure 8:
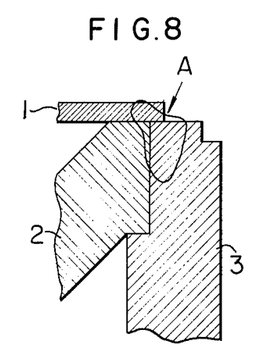

In FIG. 8 the magnetic pole 2 and the anode 3 are brought into butt contact and the seal 1 is placed thereon. The welding energy is supplied from A in the direction indicated by an arrow so as to melt the anode 3 in a larger amount than other members.

Figure 9:
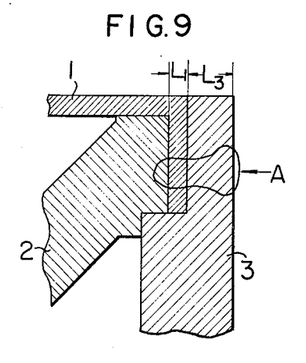

In FIG. 9, the magnetic pole 2 and the anode 3 are butted with each other with the seal 1 between them, and the welding energy is supplied laterally to the anode 3. Thickness $L_3$ of the anode 3 is made to be 1.5 times the thickness $L_1$ of the seal 1 or larger.

Figure 10:
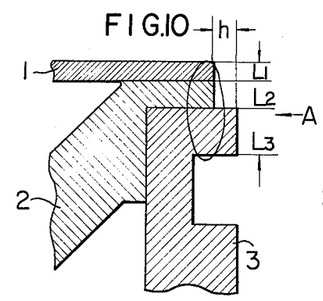

In FIG. 10, the seal 1, magnetic pole 2, and anode 3 are placed one over another, and the welding energy is supplied to the side of the structure. In this case, it is recommendable to allow the beam to swing right and left, lest the amount of copper should become deficient and the seal 1 should remain unwelded. It is also desirable that the thickness $L_3$ to be melted of the anode 3 be larger than the sum of the thickness $L_1$ of the seal 1 and the thickness $L_2$ of the magnetic pole 2, and the distance h between upper edge of the anode 3 and the edges of the seal 1 and magnetic pole 2 be larger than one third of $L_3$ but not larger than $L_3$.

Figure 11:
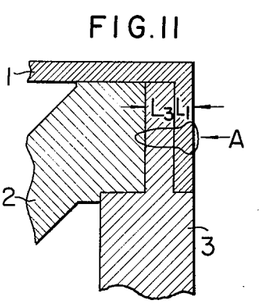

In FIG. 11, the anode 3 is interposed between the seal 1 and the magnetic pole 2, and welding is carried out in a manner similar to that in FIG. 9. It is desirable that the thickness $L_3$ of the anode be larger than the thickness $L_1$ of the seal 1, and penetration be reduced so that most part of the weld metal may be copper.

Figure 12:
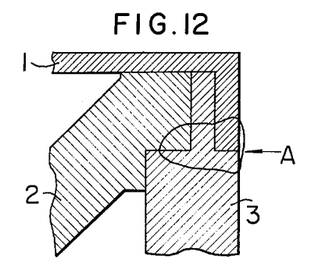

In FIG. 12, a projection is worked on the upper side of the anode 3. The seal 1 is placed in contact with one side of the projection and the magnetic pole 2 with the other side. The welding energy is supplied from A in the direction indicated by an arrow to the part near the upper side of the anode 3. With this type of joint a weld metal containing 50% by weight or more of copper may easily be obtained.

Figure 13:
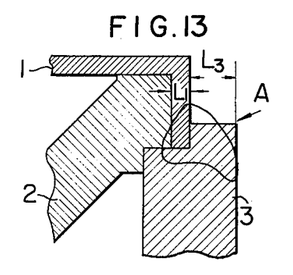

In FIG. 13, upper end of the anode is worked to form a projected portion, and the remaining part is brought into contact with the seal 1 and the magnetic pole 2. The welding energy is supplied from A in the direction indicated by an arrow to the part where contact is made. It is desirable that the thickness $L_3$ of the projection of the anode 3 be larger than the thickness $L_1$ of the seal 1.

Figure 14:
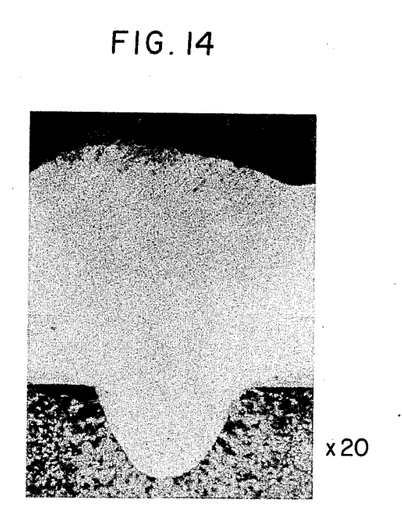
FIGS. 14 to 16 are photographs of macrostructures of the weld metals obtained when the present welding process was applied to the assembling work of a microwave oscillator tube.
Figure 15:
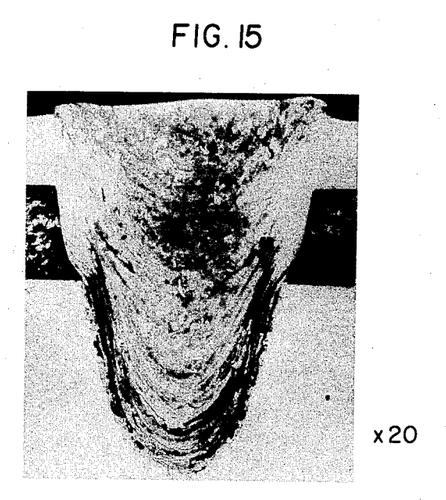
Figure 16:
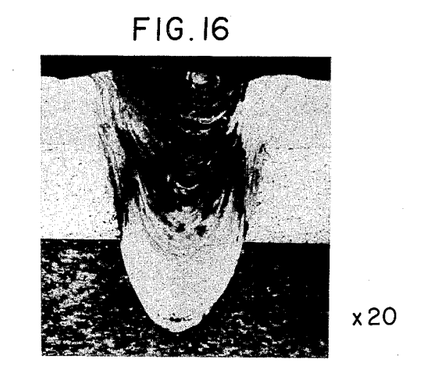
Figure 17:
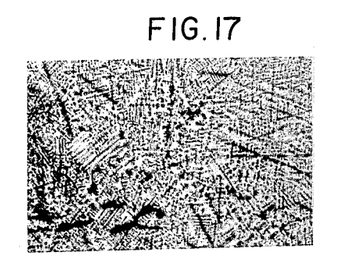
FIGS. 17 to 26 are photomicrographs of microstructures of the weld metals obtained when the present welding process was applied to the assembling work of a microwave oscillator tube.
Figure 18:
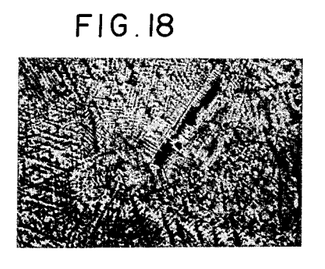
Figure 19:
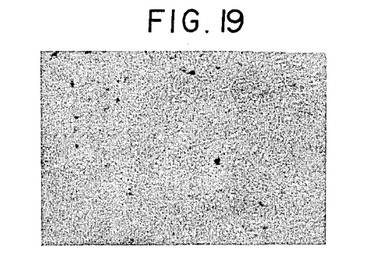
Figure 20:
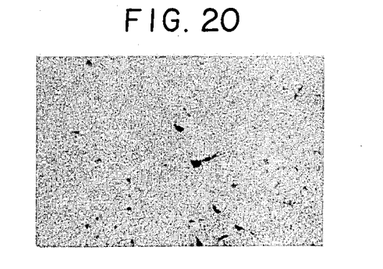
Figure 21:
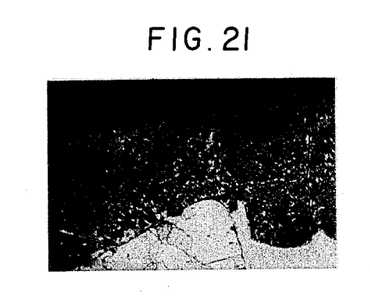
Figure 22:
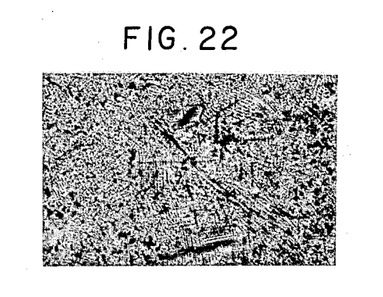
Figure 23:
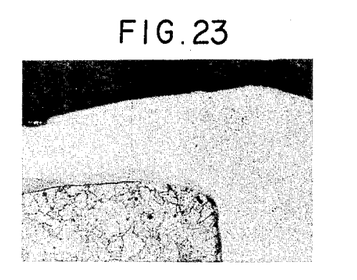
Figure 24:
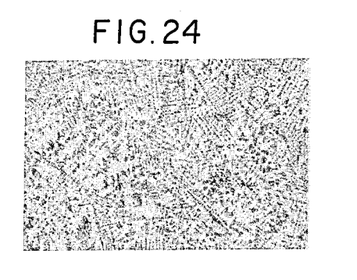
Figure 25:
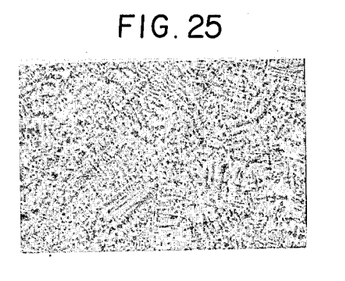
Figure 26:
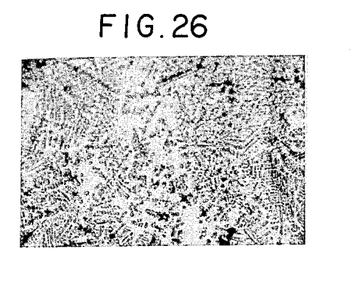

The photographs shown in FIGS. 14 to 16 reveal macrostructure of the electron-beam-welded joints (cross section) of a microwave oscillator tube, number of magnification of the photograph being 20. The welding was carried out under an acceleration voltage of 150 KV and at a welding speed of 0.5 m per minute. As the seal, an iron alloy containing nickel and cobalt in a total amount of 50% by weight was used.

The macrostructure shown in FIG. 14 is that of a joint obtained by arranging a seal, magnetic pole, and anode as shown in FIG. 9 and welding the assembly by electron beam method. The seal was 0.75 mm in thickness, the magnetic pole was made of ferro iron and the anode was made of pure copper and 1.5 mm in thickness. The weld metal contained 29.8% by weight of iron, 59.8% by weight of copper, and 10.4% by weight of nickel and cobalt combined. Weld cracking was not found.

FIG. 15 shows macrostructure of the type of joint shown in FIG. 4. The seal was 0.75 mm in thickness, the magnetic pole was of ferro iron and 1.0 mm in thickness, and the anode was of pure copper. The weld metal contained 45.0% by weight of iron, 42.2% by weight of copper, and 12.8% by weight of nickel and cobalt combined. No weld cracking was observed.

FIG. 16 shows macrostructure of the type of joint shown in FIG. 11. The seal was 0.75 mm in thickness, the anode was of pure copper and 1.0 mm in thickness at the projection, and the magnetic pole was of ferro iron. The weld metal contained 39.9% by weight of iron, 40.6% by weight of copper, and 19.5% by weight of nickel and cobalt combined. No weld cracking was detected.

The photomicrographs of macrostructures shown in FIGS. 17 to 26 are those of weld metals formed in the electron-beam-welded joints shown in FIGS. 4 to 13, respectively. The magnification number of the photographs was 100 for FIG. 23 and 400 for the rest. The compositions of the welded metals having macrostructures shown in the said figures were as shown in Table 2. The conditions of the electron beam welding were as follows: acceleration voltage, 150 KV; welding speed, 0.5 m per minute. No weld cracking was detected in every case.

Table 2

| FIG. NO. | Composition of weld metal (% by weight) | | |
|---|---|---|---|
| | Cu | Fe | Ni+Co |
| 17 | 51.0 | 28.5 | 20.5 |
| 18 | 49.4 | 37.8 | 12.8 |
| 19 | 8.7 | 50.8 | 40.5 |
| 20 | 5.2 | 52.7 | 42.1 |
| 21 | 50.0 | 38.6 | 11.4 |
| 22 | 54.9 | 33.2 | 11.9 |
| 23 | 76.0 | 17.5 | 6.5 |
| 24 | 57.6 | 30.4 | 12.0 |
| 25 | 60.0 | 29.8 | 10.2 |
| 26 | 59.0 | 24.5 | 16.5 |

In FIGS. 17 to 26, the white matrix was a metal containing copper as the main constituent and the black crystal grains were a metal containing iron as the main constituent.

Figure 27:
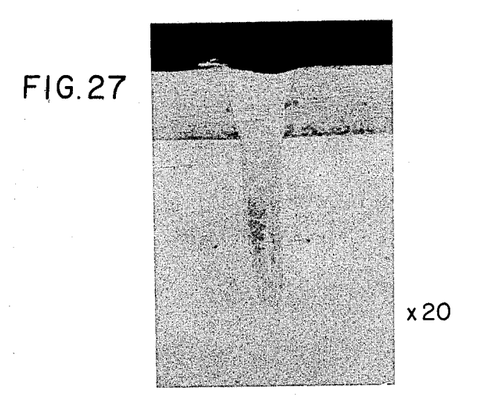
FIG. 27 is a photograph of macrostructure of the weld metal obtained in fusion welding of iron-nickel-cobalt alloy and copper.

FIG. 27 shows macrostructure of cross section of the welded portion obtained by placing an iron-nickel-cobalt alloy (nickel + cobalt was 50% by weight) 0.75 mm in thickness, over a piece of copper, 4 mm in thickness, and welding by electron beam method. Number of magnifications was 20. This weld metal had a composition falling within the area 2 in FIG. 1: 57.4% by weight copper, 22.6% by weight iron; 20.0% by weight of nickel and cobalt combined. No weld cracking was detected.

As stated above, weld cracking can be prevented when according to this invention a binary combination of an iron alloy containing 50% by weight or less of nickel and cobalt combined and copper or a ternary combination of said alloy, copper, and iron are fusion welded at a time by an electron beam welding method. Such results are obtained by a welding technique capable of supplying high-density energy for the fusion welding. Electron beam welding, laser beam welding, plasma welding which can be effected by gapless contacting, and TIG welding, without use of a filler metal, are all able to give similar results.

In the case of choosing a composition falling within the area 3, it can be applied only to, for example, welding of a copper foil and iron base metal or a nickel-cobalt-iron alloy base metal. In other words, the area where amount of copper is extremely smaller as compared with that of iron or Ni + Co cannot be actually taken in the case of the thickness of the copper base metal is large because in this case the amount of copper dissolved is large. From this fact, since when thickness of the copper base metal is comparatively large, about the same amount of energy can be applied to both base metals, i.e. copper and iron or a nickel-cobalt-iron alloy, a weld metal of the composition of the area 1, is obtained.

What is claimed is:

1. A process of fusion welding comprising the steps of forming a plurality of members, each of said members being of at least one base metal including a first base metal of an iron alloy containing up to 50% by weight of nickel and cobalt combined, a second base metal of copper, and a third base metal of iron, disposing said members in abutting relationship with respect to one another, and forming molten welding metal by applying welding energy to the abutting members, thereby forming a welding zone of said members, wherein said welding metal has a composition in the range of percent by weight as represented by at least one of the two areas surrounded by points X, $a$, $d$ and $b$, Y, Z, $c$ respectively on the three component composition diagram shown in FIG. 1.

2. A process according to claim 1, wherein the point X represents a composition comprising 97% by weight of copper, 2% by weight of iron, and 1% by weight of nickel and cobalt combined; the point Y represents a composition comprising 2% by weight of copper, 49% by weight of iron, and 49% by weight of nickel and cobalt combined; the point Z represents a composition comprising 2% by weight of copper, 97% by weight of iron, and 1% be weight of nickel and cobalt combined; the point $a$ represents a composition comprising 35% by weight of copper, 32.5% by weight of iron, and 32.5% by weight of nickel and cobalt combined; the point $b$ represents a composition comprising 10% by weight of copper, 45% by weight of iron, and 45% by weight of nickel and cobalt combined; the point $c$ represents a composition comprising 8% by weight of copper, 91% by weight of iron, and 1% by weight of nickel and cobalt combined; and the point $d$ represents a composition comprising 45% by weight of copper, 54% by weight of iron, and 1% by weight of nickel and cobalt combined.

3. A process according to claim 1, wherein said step of applying said welding energy includes one of electron beam welding, laser beam welding, plasma welding, and TIG welding without a filler material.

4. A process according to claim 1, wherein said steps of disposing said members and applying said welding energy are carried out such that said welding zone is provided with width and depth dimensions sufficient for obtaining said composition of said welding metal.

5. A process according to claim 4, wherein each of said members are provided with dimensions at said welding zone appropriate for producing said width and depth dimensions of said welding zone.

6. A process according to claim 1, wherein copper content of the welding metal is 70% by weight at maximum.

7. A process according to claim 1, wherein nickel content of the iron-nickel-cobalt alloy is at least 1.5 times the cobalt content.

* * * * *